(No Model.)
W. H. PARRISH.
THRASHING AND CLEANING MACHINE.
No. 296,441. Patented Apr. 8, 1884.
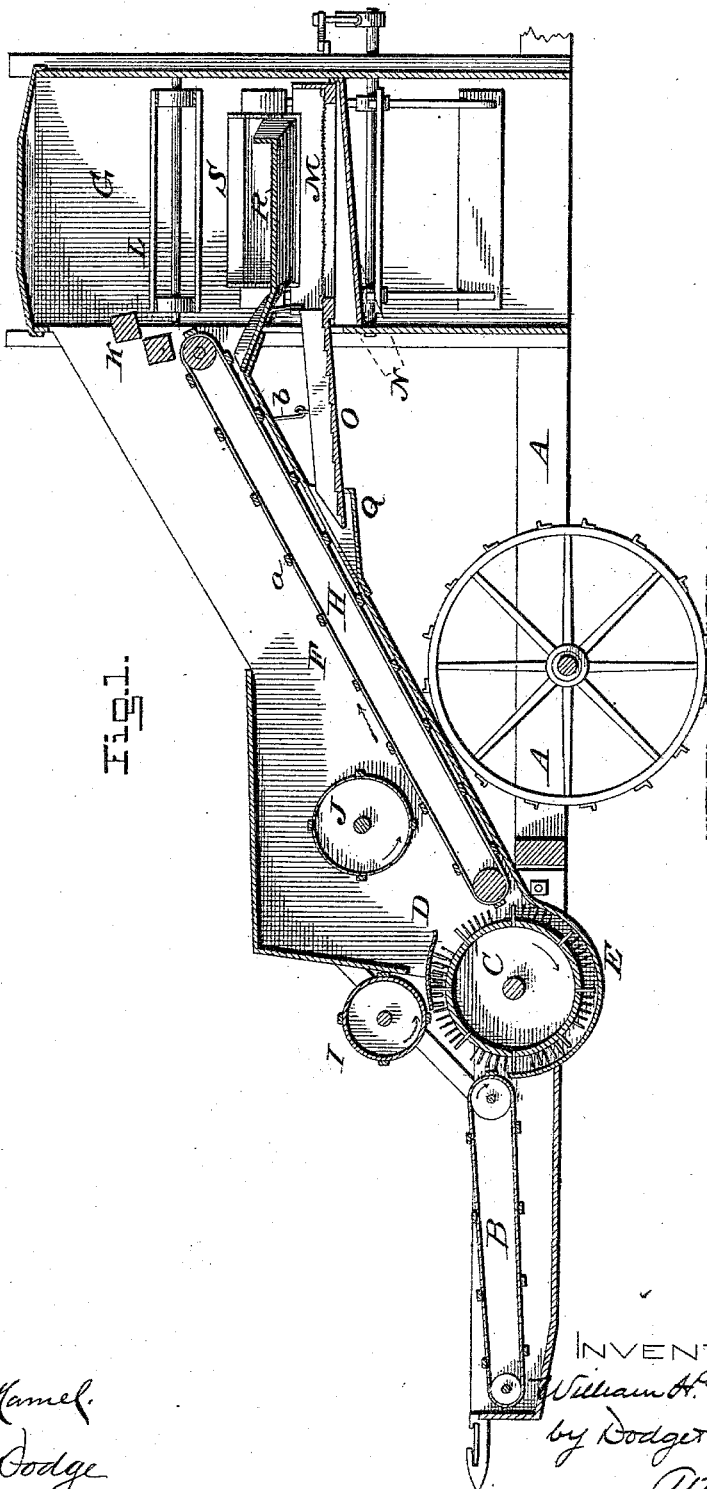

(No Model.) W. H. PARRISH. 2 Sheets—Sheet 2.
THRASHING AND CLEANING MACHINE.
No. 296,441. Patented Apr. 8, 1884.
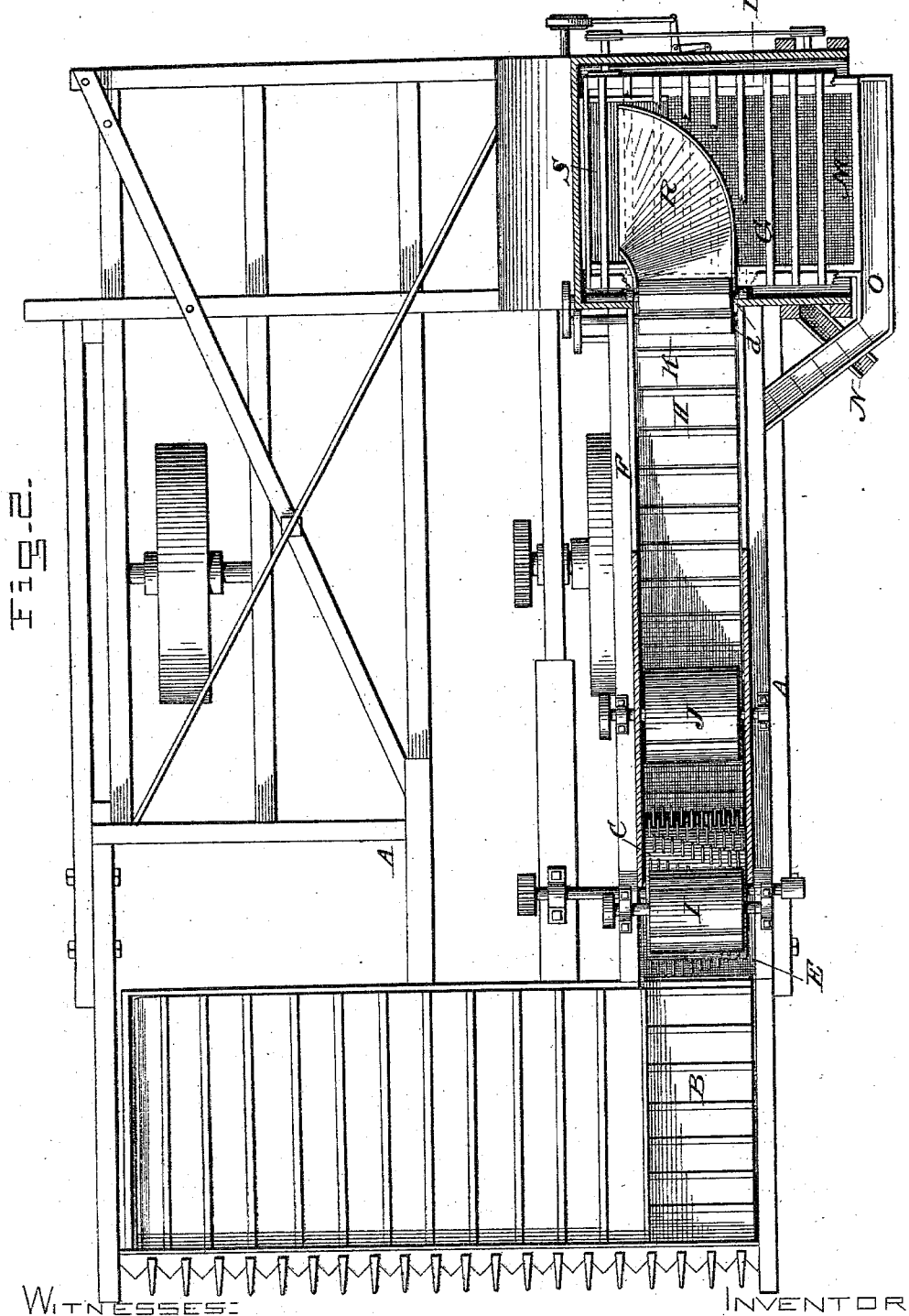

UNITED STATES PATENT OFFICE.

WILLIAM H. PARRISH, OF SALEM, OREGON.

THRASHING AND CLEANING MACHINE.

SPECIFICATION forming part of Letters Patent No. 296,441, dated April 8, 1884.

Application filed September 29, 1883. (No model.)

*To all whom it may concern:*

Be it known that I, WILLIAM H. PARRISH, of Salem, in the county of Marion and State of Oregon, have invented certain Improvements in Thrashing and Cleaning Machines, of which the following is a specification.

My invention relates to grain thrashing, cleaning, and separating machines, and particularly to a machine of this class designed for use in connection with or upon a harvester of the style commonly termed "headers."

In the accompanying drawings, Figure 1 represents a vertical section through the apparatus from front to rear; Fig. 2, a top plan view with the toothed concave and the cover or top of the trunk removed.

In order to make more clear the purposes of the present invention, it is necessary to first point out the difficulties commonly encountered in practice with machinery of this class used in connection with harvesters or headers.

It is, of course, well understood that considerable power is required to operate the harvesting or reaping mechanism alone, and of course the addition of machinery for thrashing and cleaning the cut grain materially increases the amount of power required. In some sections of the country the practice prevails of cutting only the heads of the grain, leaving the stalks or straw standing in the field, and to thrash and clean the heads thus cut by apparatus carried by the harvester or header. This latter operation, under the ordinary construction and arrangement of apparatus, adds so much to the resistance to be overcome and to the consequent power required to propel and operate the machine that the plan has for a long time been looked upon by many as impracticable. The main causes of such extra resistance are found to be the thrashing-cylinder, and particularly the sudden change of direction given the grain in passing between said cylinder and its concave and the elevators or conveyers employed to carry the tailings from the separator back to the thrashing-cylinder. The first of these difficulties I partially overcome by a careful proportioning of the thrashing-cylinder to the width of cut of the machine, as explained in another application, and by arranging the toothed concave above instead of below the cylinder, in such position that the thrashing-cylinder forms, as it were, a continuation of the feeding-apron, and takes the grain therefrom to the concave without materially diverting its line of travel, and without the consequent loss of power. The power formerly required for conducting the tailings back to the thrashing-cylinder is rendered unnecessary by placing the cylinder and the tailings-spout at such relative levels that the latter can deliver back into the trunk of the elevator passing from the cylinder to the cleaner or separator.

I desire to say here that I am aware that overshot thrashing-cylinders are very old, and that I make no claim thereto, broadly considered; but the arrangement and combination of parts referred to I believe to be new, and have found highly useful, the difference in power required being equivalent to that furnished by two horses under ordinary circumstances.

Referring again to the drawings, A represents the frame of a harvester or header, (though it is of course to be understood that the apparatus may be mounted upon a special frame of its own;) B, the draper or feeding-apron, by which the cut grain or heads pass to the thrashing apparatus; C, the thrashing-cylinder; D, its toothed or spiked concave; E, a smooth concave beneath the cylinder; F, a trunk extending from the rear side of the smooth concave upward to the cleaning and separating machine G; H, a carrier-apron within said trunk; I, a beater over the mouth of the spiked concave, and J a like beater over the lower end of the elevator-apron.

The feed-apron or draper B has its delivery end at or above the horizontal plane of the axis of the cylinder C, preferably somewhat above, as shown in Fig. 1, and the draper or apron inclining slightly upward, so that the grain passing over the draper shall ride easily upward upon the cylinder, with scarcely appreciable change in its direction, instead of being suddenly and sharply diverted from its course and carried downward at right angles to the line of its inflow, as in machines of ordinary construction. Experience in the field has demonstrated that a great saving in power is thus effected. The rapid upward movement of the cylinder past the discharge end of the feed-apron B is liable to throw the grain off at a tangent, and if a simple guard or shield be employed to prevent such throwing off of the grain, there is danger of causing the grain to clog up the mouth of the concave. I therefore locate just over and slightly in advance of such mouth a rotary beater or ribbed drum, I, rotating in a direction the reverse of that of cylinder C, so that the two co-operate to draw in the grain and insure its proper feeding between the cylinder and concave. This beater also bears down and insures the proper entrance of tangled heads and straw and other bushy or bulky matters which might otherwise fail to properly enter beneath the concave. As the grain and straw, together with chaff, dirt, and other matters, pass beneath the concave, they are thrown forward upon the upwardly-traveling upper face of an endless apron or carrier, H, provided with slats, a, as shown, to insure the proper carrying of the grain and other matters which might otherwise roll down the apron toward the cylinder C.

Just over the head of the carrier-apron H, I place one or more small beaters or pickers, K, over which the straw and coarse trash pass to the slatted straw-carrier L of the cleaning and separating machine G, which carrier, consisting merely of slats applied to narrow endless belts, permits such loose grain as may be held by the straw to fall out, and to pass downward to the screen or riddle M, which also receives the body of loose grain carried up by the elevator or carrier-apron H and discharged directly from its head. The grain, in passing over and in falling through the riddle, is subjected to the action of an air-current, as usual in such machines, and the cleaned grain is delivered by a spout, N, to bags or other receptacles, as heretofore. The tailings from the riddle M are delivered into a tailings-trough, O, having a slight downward inclination, and advisably corrugated, as shown, which trough is suspended by links b, or otherwise sustained, and is connected with or made as a continuation of the shaking-shoe P. The delivery end of this trough overhangs a pocket or receiver, Q, which opens directly into the trunk F, as shown, so that the tailings will be discharged into said trunk and carried downward by the lower side of the apron or conveyer H to the concave E, whence they are taken up and carried through the spiked concave D by the thrashing-cylinder C, and all remaining grain is thus taken out.

The cleaning and separating machine G may be of any ordinary or approved construction, and the parts may be belted or geared, as required, motion being received, primarily, from the master-wheel. As both gearing and belting for such machines are common and well known, there is no occasion to describe them, the only requirements being that the parts be driven in the directions indicated and at proper relative speeds.

In order that the grain may be evenly spread across the head of the riddle or screen, I mount upon one side of the shaking-shoe P a curved chute or guide-board, R, which overlaps the end of trunk F, as shown in Fig. 2, and is curved or bent so as to direct the grain to an inclined board or chute, S, whence it rolls down upon the screen or riddle close to and entirely across its head. Being attached to or carried by the shaking-shoe the chute or board R is caused to shake in unison therewith, and thus to prevent the clogging of grain at the head of the elevator.

The beater I may be brought into or thrown out of action as required, being needed more particularly when the grain is tangled.

Having thus described my invention, what I claim is—

1. In combination with a traveling endless feed-apron, an upwardly-moving thrashing-cylinder and a concave above the same, and an elevator-apron directly in rear of said cylinder and concave, said parts being arranged as shown, whereby the straw and grain are delivered from the feed-apron to the elevator-apron without materially changing the direction of their travel.

2. In combination with an overshot thrashing-cylinder and a concave above the same, a traveling feed-apron having its delivery end close to the mouth of the concave, and a ribbed beater located over the mouth of the concave, substantially as and for the purpose explained.

3. The combination, with overshot thrashing-cylinder C and its concave D, located above the same, endless traveling feed-apron B, elevator H in rear of the cylinder, and beater J, located over the receiving end of the elevator, all substantially as shown and described, whereby grain placed upon the feed-apron is caused to pass between the cylinder and concave and up the elevator without materially altering its direction.

4. The combination, substantially as herein shown and described, of a thrashing-cylinder and concave, a trunk extending backward from said cylinder and concave, an elevator-apron within said trunk, a cleaning mechanism independent of the elevator-apron, and a tailings-spout extending from the cleaning mechanism into the elevator-trunk beneath the elevator-apron, whereby said apron is caused both to elevate the grain from the thrashing-cylinder and to return the tailings thereto from the cleaning mechanism.

5. In combination with a thrashing-machine, a grain-cleaner, and an elevator-trunk extending from the former to the latter, a tailings-spout arranged substantially as shown and described, to return the tailings from the cleaner into the elevator-trunk, whereby they are reconveyed to the thrashing-machine.

6. The combination, substantially as herein shown and described, of a thrashing-cylinder and concave, a grain cleaner or separator, a trunk, F, connecting the thrashing and cleaning mechanisms, an endless elevator-apron, H, within said trunk, and a shaking-trough, O, arranged substantially as shown, to receive the tailings from the cleaner, and having its discharge end extended into trunk F beneath the apron H, substantially as and for the purpose explained.

7. In combination with cylinder C and with a spiked concave above the same, a smooth concave below said cylinder, an elevator-trunk extending upward from the smooth concave to a cleaner or separator, a grain-cleaner, and a tailings-trough arranged to receive the tailings from the cleaner, and having its discharge end extended into an opening at the under side of the elevator-trunk, substantially as shown.

8. The herein-described thrashing and cleaning machine, consisting of thrashing-cylinder C, spiked concave D above said cylinder, smooth concave E below said cylinder, trunk F, extending upward from concave E, cleaner G, located at the delivery end of trunk F, carrier H within said trunk, riddle M, shaking-shoe P, and trough O, arranged substantially as shown, to deliver the tailings into trunk F.

9. The combination, substantially as set forth, of cylinder C, concaves D E, trunk F, cleaner G, carrier H, beaters I J, cylinders K, straw-carrier L, riddle M, shaking-shoe P, tailings-spout O, and pocket Q, all constructed and arranged to operate substantially as set forth.

10. In combination with elevator H and grain-cleaner G, having a shaking-shoe, a curved chute or board, R, connected with the shoe, and serving, substantially as explained, to deliver the grain at the head of the riddle and from side to side thereof.

WILLIAM H. PARRISH.

Witnesses:
 WALTER S. DODGE,
 WILLIAM W. DODGE.